United States Patent
Jardin

[11] 3,904,239
[45] Sept. 9, 1975

[54] WIND DEFLECTOR FOR AUTOMOBILE WITH SLIDING ROOF

[75] Inventor: Hans Jardin, Krailling, Germany

[73] Assignee: Webasto-Werk W. Baier KG, Stockdorf, Munich, Germany

[22] Filed: Apr. 11, 1974

[21] Appl. No.: 460,055

[30] Foreign Application Priority Data
May 19, 1973 Germany............................ 2325594

[52] U.S. Cl................................ 296/137 J; 296/91
[51] Int. Cl.²............................................. B60J 7/22
[58] Field of Search.......... 296/137 J, 137 E, 137 F, 296/15, 91

[56] References Cited
UNITED STATES PATENTS
3,711,150   1/1973   Perks ............................. 296/137 J FOREIGN PATENTS OR APPLICATIONS
980,012   1/1965   United Kingdom.............. 296/137 J
79,778   10/1954   Netherlands..................... 296/137 J

*Primary Examiner*—Frank E. Werner
*Assistant Examiner*—Gary Auton
*Attorney, Agent, or Firm*—Joseph A. Geiger

[57] ABSTRACT

A wind deflector for an automobile sliding roof having an upwardly-biased, pivotable panel mounted on bending hinges and linked to two lateral levers engaging the panel with a pin and slot connection, which levers are engageable by the sliding roof panel to automatically retract the wind deflector panel during the closing operation of the sliding roof.

6 Claims, 4 Drawing Figures

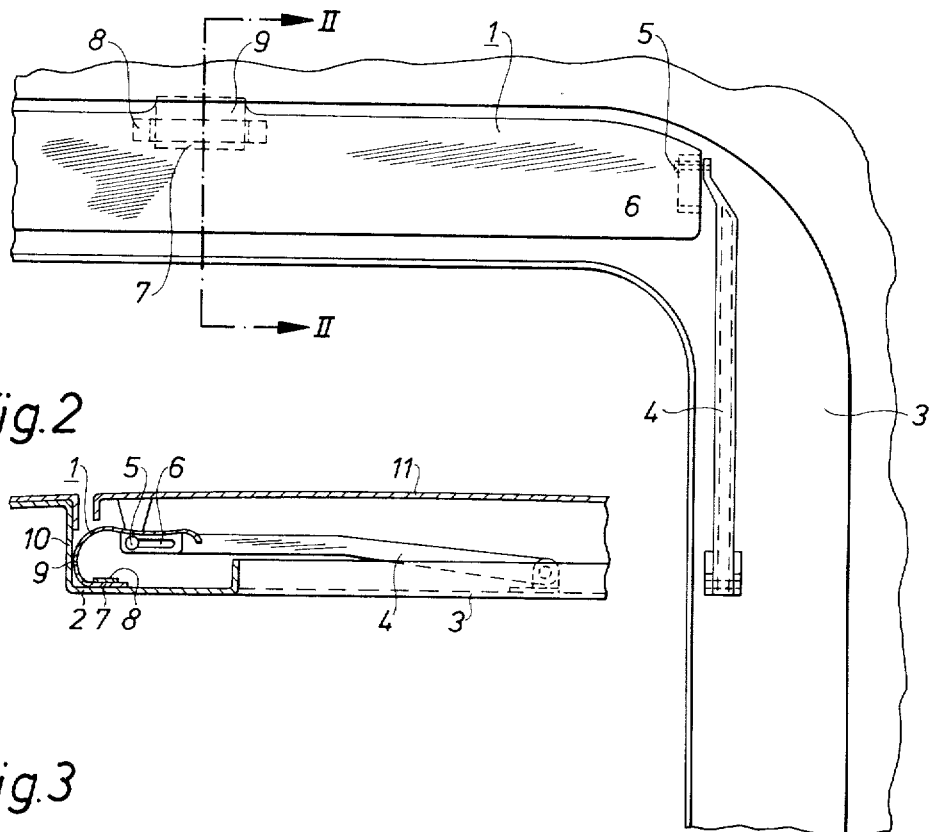
Fig.1
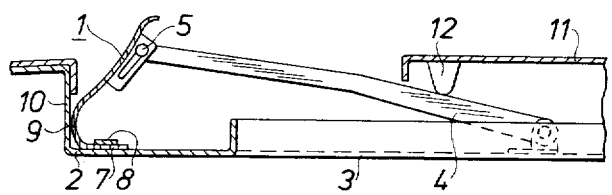
Fig.2
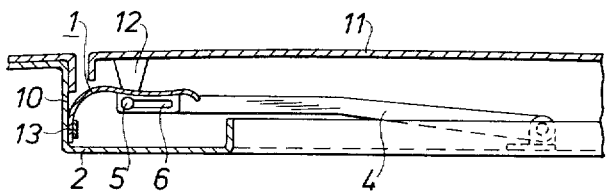
Fig.3
Fig.4

WIND DEFLECTOR FOR AUTOMOBILE WITH SLIDING ROOF

BACKGROUND OF THE INVENTION

1. Field of the Invention

The present invention relates to wind deflectors for automobile roof openings, and in particular to pivotable wind deflectors arranged at the leading edge of the sliding roof openings which are automatically extended and retracted by the operation of the sliding roof mechanism.

2. Description of the Prior Art

The German Pat. No. 1,149,627 discloses a pivotable wind deflector mounted on a vertical portion of the roof frame surrounding the sliding roof opening. The lateral extremities of the wind deflector panel are connected to spring struts producing a toggle effect on the wind deflector panel so that the latter is biased into either its extended or its retracted position. The spring struts include cam ridges which are engageable by the closing sliding roof panel, when the deflector panel is extended. This arrangement provides for the automatic retraction of the wind deflector panel by the closing motion of the sliding roof panel. However, the extension of the wind deflector panel is not obtained automatically and must be done by hand, after the sliding roof panel is opened.

This prior art solution, besides lacking the automatic extension feature, has the additional disadvantage of being comparatively complex in structure and consequently expensive to manufacture and assemble.

SUMMARY OF THE INVENTION

It is the primary objective of the present invention to overcome the aforementioned shortcomings, by suggesting a simplified design of a wind deflector which is automatically extended and retracted by the operation of the sliding roof mechanism and which is inexpensive to manufacture, easy to assemble, and reliable in operation.

In order to attain the above objective, the present invention suggests a wind deflector structure in which the wind deflector panel is pivotable as a result of the bendability of integral extensions of the deflector panel itself. Because of this bending-hinge action of the wind deflector panel, it becomes possible to simply provide a fixed attachment between the inner edge of the wind deflector panel and the roof frame.

In a preferred embodiment of the invention this fixed attachment between the inner edge of the bending hinge extension of the wind deflector panel and the roof frame is obtained by inserting these edges under an anchoring bracket which presents an insertion slot. The engagement between the hinge extensions and these anchoring brackets may also be of the self-locking type. The lateral linkages engaging the extremities of the wind deflector panel for their automatic extension and retraction in response to the sliding roof panel motion are preferably in the form of simple, rigid levers whose rearward ends are pivotably attached to the bottom of the lateral rain channel and whose forward ends cooperate with the extremities of the wind deflector panel in a cam-and-follower connection. This cam-and-follower connection is preferably provided in the form of a pin extending from the lever and engaging an appropriately oriented slot in the wind deflector panel.

The attached bending hinge extensions of the wind deflector panel are preferably positioned contiguous with the bottom of the front rain channel, the hinge extensions being thereby bent upwardly against the vertical portion of the roof frame so as to exert a bias thereagainst and against the anchoring brackets. This preload condition locks them in place. Alternatively, these bending hinge extensions may be attached to the vertical frame portion, in which case self-locking means are necessary in conjunction with the engagement of the hinge extensions under the anchoring brackets. These may be the snap-retention type, for example.

BRIEF DESCRIPTION OF THE DRAWING

Further special features and advantages of the invention will become apparent from the description following below, when taken together with the accompanying drawing which illustrates, by way of example, an embodiment of the invention, represented in the various figures as follows:

FIG. 1 illustrates in a plan view the forward righthand corner of a sliding roof structure with a wind deflector embodying the invention, the sliding roof panel itself being removed;

FIG. 2 is a transverse cross section through the structure of FIG. 1 along line II—II thereof;

FIG. 3 shows the structure of FIG. 2 with the wind deflector in the extended position; and FIG. 4 is a cross section similar to that of FIG. 2, illustrating a modified embodiment of the invention.

DESCRIPTION OF THE PREFERRED EMBODIMENT

In FIGS. 1–3 is illustrated the right-hand portion of a wind deflector assembly in which a wind deflector panel 1 is pivotably attached to the front portion of a roof frame 2 surrounding the roof opening. This roof frame 2 serves not only to reinforce the roof structure around the opening, it also is a rain channel and supports the various components of the sliding roof mechanism (not shown). Obviously, the structure shown in FIG. 1 is duplicated on the left-hand side of the roof. A lever 4, reaching from a pivot point in the lateral roof frame portion 3 to the lateral extremity of the wind deflector panel 1, engages a slotted block 6 of the wind deflector panel by means of a pin 5. This cam-and-follower connection between the lever 4 and the wind deflector panel 1 forces the panel 1 from its extended position, (FIG. 3) to its bent, or retracted position, shown in FIG. 2, when the lever 4 is moved downwardly a short distance. This pivoting action of the wind deflector panel 1 is obtained by virtue of the flexibility of several so-called bending hinges which are integral extensions of the wind deflector panel 1. The inner edges of these bending hinge extensions 9 are attached to the roof frame 2 by means of anchoring brackets 8 which are attached to the horizontal bottom wall of the rain channel of frame 2. The inner edge 7 of the bending hinge extension 9 is thus confined under the anchoring bracket 8 and held in this position by the vertical wall 10 of frame 2, against which the bending hinge extension 9 is biased. Obviously, this design is very easy to assemble, requiring merely the insertion of the inner edges 7 under the anchoring brackets 8.

In FIG. 4 is illustrated a modified embodiment of the invention in which the bending hinge extensions of the wind deflector panel 1 are attached to the vertical wall 10 of the roof frame 2. This design features a still further simplification of the assembly operation, by eliminating the preload-bending of the hinge extension 9 which was necessary in the earlier-described embodiment. However, this type of wind deflector panel 1 will require modified inner edges 13 of the bending hinge extensions 9 so as to produce a self-locking engagement with the anchoring brackets 8. This can be achieved in various known ways, such as by providing nose portions or the like on the inner edges 13 which can be inserted under the anchoring brackets in a wedging action and which snap into place after insertion.

Because of the spring action of the bending hinge extensions 9, the wind deflector panel 1 has a tendency to assume its extended position, shown in FIG. 3. Its maximum extension is determined by the cam-and-follower connection 5, 6 with the lever 4, which is thereby also pivoted to an upper position. This upper position of the lever 4 is only then possible, when the sliding roof panel 11 is retracted from its closed position (FIG. 2) to an at least partially opened position. Conversely, when the sliding roof panel 11 is moved forwardly in order to be closed, it engages the lever 4 by means of a downwardly pointing nose 12, thereby pushing the lever 4 downwardly and retracting the wind deflector panel 1 through the earlier-described interaction of its cam-and-follower connection with said panel. Thus, the wind deflector panel 1 is automatically permitted to extend upwardly, when the sliding roof is opened, and is again automatically retracted, when the roof is closed.

It should be understood that the automatic extension of the wind deflector panel 1 need not rely on the resiliency of the bending hinge extensions 9, but that it may also be provided by any other suitable upwardly directed spring bias on either the wind deflector panel 1 or the lever 4. For example, the lever 4 could be biased upwardly by a simple compression spring or by a torsion spring engaging its pivot attachment in the rain channel.

It should be further understood that the foregoing disclosure describes only a preferred embodiment of the invention and that it is intended to cover all changes and modifications of this example of the invention which fall within the scope of the appended claims.

I claim:

1. In a sliding roof structure for automobiles in which a generally rectangular roof opening is surrounded by a roof frame that serves as a rain channel and as a support for a sliding roof mechanism, and in which said mechanism includes a rigid sliding roof panel which is openable through lowering of its rear edge and rearward retraction of the panel from the roof opening, a wind deflector assembly comprising in combination:

a wind deflector panel extending along the forward transverse edge of the roof opening, one edge of said panel being pivotably attached to the adjacent transverse rain channel portion of said roof frame by means of a bending hinge, thereby defining a horizontal transverse pivot axis around which the wind deflector panel is pivotable between a retracted position in which the panel is positioned below the roof level underneath the front portion of the sliding roof panel when the latter is closed, and an extended position in which the free edge of the wind deflector panel is positioned above the roof opening;

a lever connected to each lateral extremity of the wind deflector panel by a cam-and-follower connection and extending rearwardly to a pivot point on the lateral portion of the roof frame, the two levers being pivotable between an upper and a lower position, thereby moving the wind deflector panel between its extended and retracted positions, respectively, through the action of said cam-and-follower connection;

means for biasing the wind deflector panel toward its extended position; and means defined by the sliding roof mechanism and by said levers for depressing the levers and retracting the wind deflector panel, when the sliding roof moves into its closed position; and wherein said bending hinge is arranged to also fulfill, at least in part, the function of said biasing means.

2. A wind deflector assembly as defined in claim 1, wherein:

said cam-and-follower connection includes a slot in each extremity of the wind deflector panel forming a cam, and a pin in each of the two levers in alignment with the other pin engaging said slot as a cam follower, the slots being so oriented that the wind deflector panel is extended upwardly when the levers are raised and retracted when the levers are lowered.

3. A wind deflector assembly as defined in claim 1, wherein:

the bending hinge includes at leat two integral hinge extensions on the inner longitudinal edge of the wind deflector panel, the hinge extensions being resiliently bent, as the wind deflector panel is pivoted to its retracted position.

4. A wind deflector assembly as defined in claim 3, wherein:

the forward portion of the roof frame includes a channel profile with a substantially vertical wall portion extending downwardly from the edge of the roof opening and a substantially horizontal wall portion extending rearwardly therefrom; and the bending hinge further includes for each hinge extension an anchoring bracket which is attached to the inside of said channel profile so as to define with the channel wall an insertion slot for the engagement therein of the far end of the hinge extension.

5. A wind deflector assembly as defined in claim 4, wherein:

the anchoring brackets are attached to the horizontal channel wall portion at such a distance from the vertical channel wall portion that said bending hinge extensions bear against the vertical channel wall portion through the action of a bending preload, thereby maintaining said hinge extensions engaged in said insertion slots.

6. A wind deflector assembly as defined in claim 4, wherein:

the anchoring brackets are attached to the vertical channel wall portion; and the bending hinge extensions, in conjunction with the anchoring brackets, define snap-type retaining means for maintaining said hinge extensions engaged in said insertion slots.

* * * * *